P. H. LINT.
FRUIT GATHERER.
APPLICATION FILED SEPT. 23, 1912.

1,104,431.

Patented July 21, 1914.

2 SHEETS—SHEET 1.

WITNESSES
F. C. Fliedner
N. B. Keating

INVENTOR
Peter H. Lint
BY
F. M. Wright,
ATTORNEY

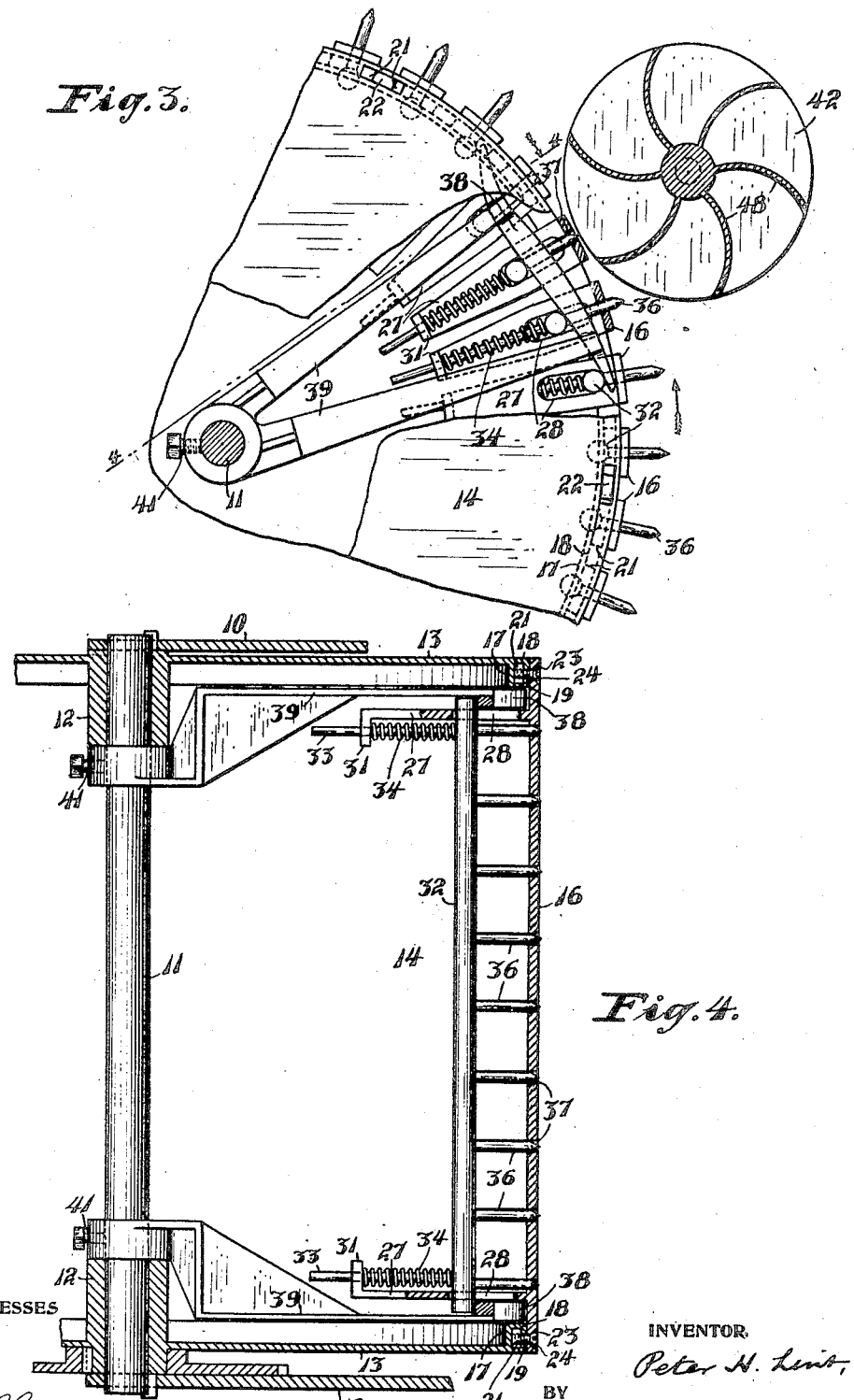

UNITED STATES PATENT OFFICE.

PETER H. LINT, OF SAN FRANCISCO, CALIFORNIA.

FRUIT-GATHERER.

1,104,431.

Specification of Letters Patent. Patented July 21, 1914.

Application filed September 23, 1912. Serial No. 721,858.

*To all whom it may concern:*

Be it known that I, PETER H. LINT, a citizen of the United States, residing at San Francisco, in the county of San Francisco and State of California, have invented new and useful Improvements in Fruit-Gatherers, of which the following is a specification.

The present invention relates to machines for gathering prunes and other fruit from the ground, the object of the invention is to provide such a machine, which will gather and automatically deliver them into a suitable receptacle without danger of unduly crushing the fruit.

Figure 1:
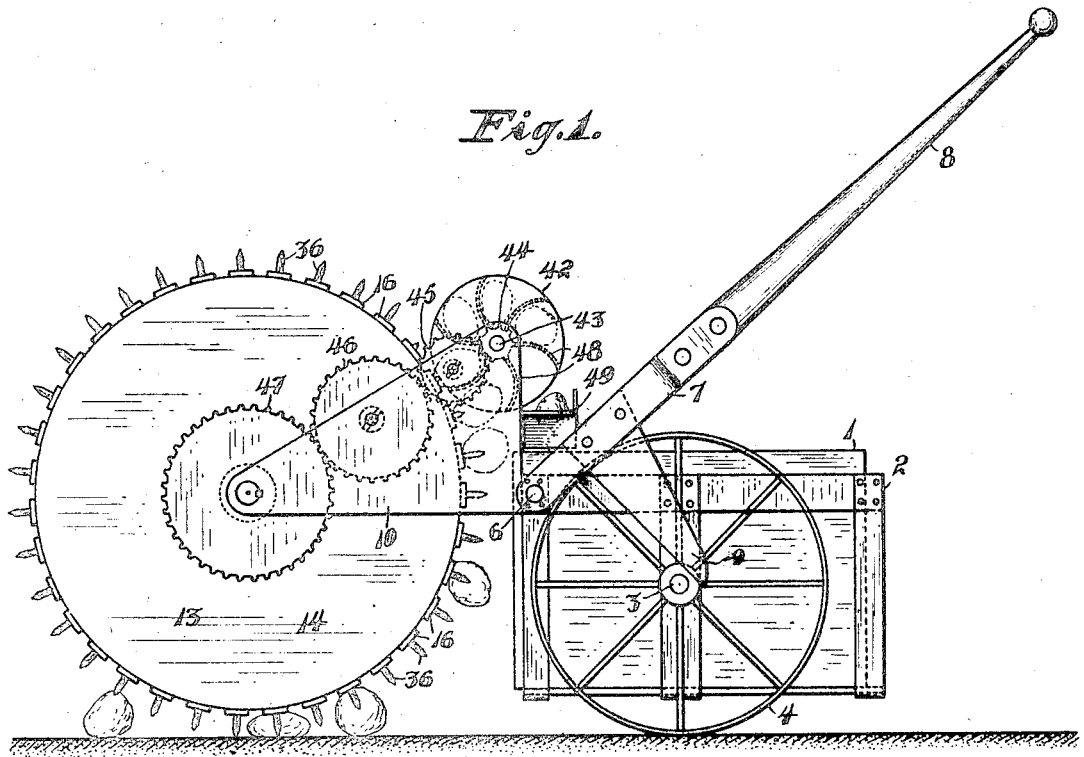
Figure 2:
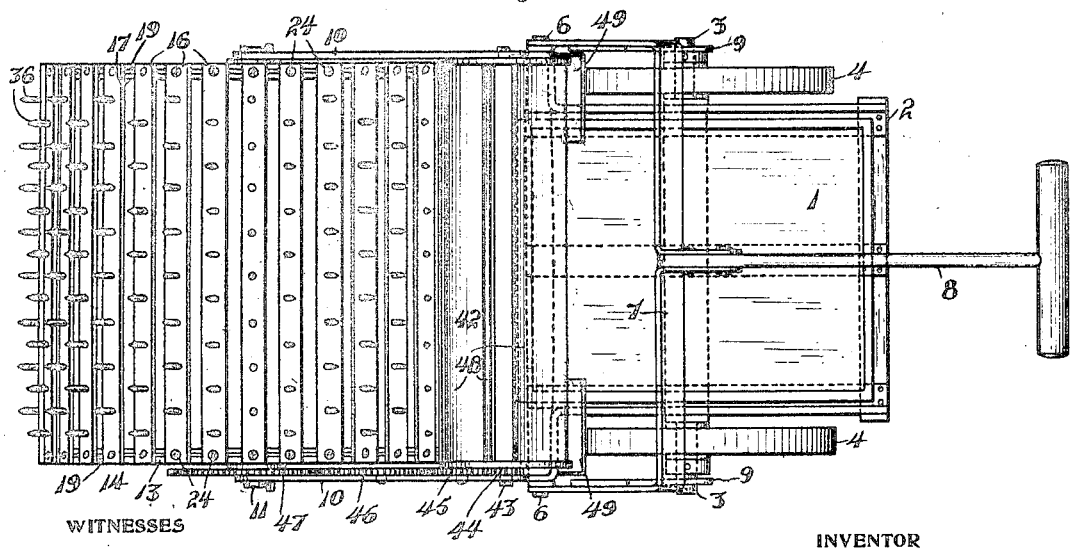

In the accompanying drawing, Figure 1 is a side elevation of my improved fruit gatherer; Fig. 2 is a plan view thereof; Fig. 3 is an enlarged vertical sectional view of portions of the main drum and of the transferrer; Fig. 4 is a transverse section on the line 4—4 of Fig. 3.

Referring to the drawings, 1 indicates a box or receptacle for containing the fruit after it has been gathered. Said receptacle can slide into, or out of, a metallic frame 2, from which extend trunnions 3 for wheels 4 by which the receptacle can be transported. From said frame 2 extend short shafts 6, on which are pivoted the members of a yoke 7, from which extends a handle 8, for guiding the apparatus. From the members of said yoke depend, rigidly secured thereto, arms 9. The sides of said frame 2 have forward extensions 10 in the front ends of which is rigidly secured a shaft 11, upon the terminal portions of which are rotatably mounted hubs 12 of the end pieces 13 of a cylindrical drum 14. The cylindrical surface of the drum is formed by metallic slats 16, secured to the drum ends in the following manner. Each drum end is formed at its periphery with an extension 17 forming a circumferential channel or slot 18, having a continuous circular opening 19 on the outer side. In this channel fit snugly nuts 21, the side of the channel being formed with a suitable number of small openings 22 through which said nuts can be introduced into the channel. Each end of a slat is formed with a bolt hole 23, the slats being countersunk to receive the heads of the bolts. Bolts 24 pass through said bolt holes and through the opening in the channel, and engage said nuts in said channel. When the bolts are not fully screwed up into the nuts, the slats can be moved circumferentially around the rim of the drum end to any desired position, and they can be secured in such position by screwing the bolts in the nuts, thereby drawing the nuts tightly against the upper side of the channel. In this way the distance between the slats can be varied as desired, certain slats being, of course, removed when the slats are placed farther apart in the drum, and being added when they are placed nearer together.

Formed integral with each slat near the ends thereof are two inwardly extending guides 27 having slots 28 and bent at their inner ends at right angles to each other, as shown at 31, said bent portions 31 being apertured. Extending through the slots in the guides are the terminal portions of pin holders 32, to which pin holders are secured rods 33 which pass through the apertures in the bent portions 31, coiled springs 34 surrounding said rod and being compressed between said pin holder and bent portions. Secured to each pin holder are pins 36 in longitudinal series, the outer portions of which extend through holes 37 formed in the slat 16. Normally the compressed coiled springs 34 press said pin holders outward so that said pins extend outwardly from said slat, but at a certain point in the revolution of the drum, said pins are withdrawn inward through the holes in the slats, this being effected by means of cams 38 formed integral with brackets 39 fixedly secured, as shown at 41, upon the stationary shaft 11, which cams engage the terminal portions of the pin holders 32.

The drum being rolled over the ground, the pins penetrate the prunes or other fruit lying on the ground, and raise them so that they travel with the periphery of the drum until a point is reached, as shown in Fig. 1, at which the pins are withdrawn by the action of the cams 38, whereupon the prunes, being no longer held upon said pins, drop into a rotary transferrer 42, mounted upon a shaft 43 having bearings in the extensions 10, and rotated, at the same peripheral velocity as the drum, by means of gear wheels 44, 45, 46, 47, intermeshing in series. Said transferrer has a circumferential series of curved blades 48 forming pockets, into which the prunes released from said pins fall. From the terminal portions of the transferrer the prunes are delivered into a chute 49, from which they fall into the box 1, and from the median portion of the transferrer they fall directly in said box.

By reason of the fact that the pins are entirely withdrawn from the prunes at the time when the blades of the transferrer reach said prunes, there is no danger of the prunes being crushed by compression between said pins and the blades of the transferrer.

To raise the drum from the ground, for the purpose of merely transporting it without gathering fruit, the handle is lowered, so that the arms 9 come in contact with the ends of the trunnions 3, and then a further lowering of the handle causes said drum to be so lifted.

I claim:—

1. In a fruit gatherer, the combination of a drum comprising end pieces, and longitudinally extending slats adjustably secured to said end pieces, outwardly projecting pins movable radially through the slats, a receptacle, means whereby said drum and receptacle move over the ground in unison, means for withdrawing said pins, operated automatically upon the arrival of the pins at a predetermined point in their rotation with the drum, and means for transferring to the receptacle the fruit released from the pins so withdrawn.

2. In a fruit gatherer, the combination of a drum, a shaft on which said drum rotates, pins projecting, and movable, radially outward from the drum, springs arranged to press said pins outwardly therefrom, a receptacle, means on which said receptacle is removably supported, cams carried by said shaft and arranged to withdraw said pins against outward pressure of said springs, and means for transferring to the receptacle the fruit released from the pins so withdrawn.

3. In a fruit gatherer, the combination of a drum comprising end pieces and longitudinally extending apertured slats secured thereto, having guides, pinholders movable in said guides, springs pressing said pinholders outward, a shaft on which said drum rotates, radially projecting pins secured to said pinholders, a receptacle, wheels on which said receptacle is removably supported, cams carried by said shaft arranged to actuate said pinholders to withdraw said pins, and means for transferring to the receptacle the fruit released from the pins so withdrawn.

In testimony whereof I have hereunto set my hand in the presence of two subscribing witnesses.

PETER H. LINT.

Witnesses:
FRANCIS M. WRIGHT,
D. B. RICHARDS.